G. W. SPENCER.
TAPPING APPARATUS.
APPLICATION FILED MAY 24, 1909.
965,762.
Patented July 26, 1910.
2 SHEETS—SHEET 1.
FIG.1.
FIG.2.
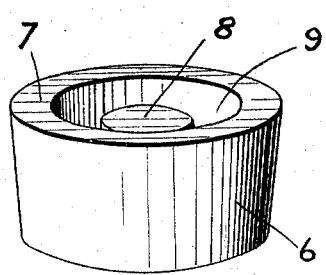
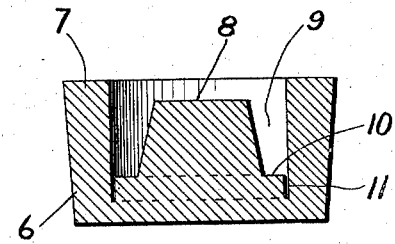
FIG.3.
FIG.4.
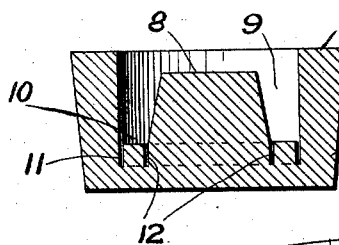
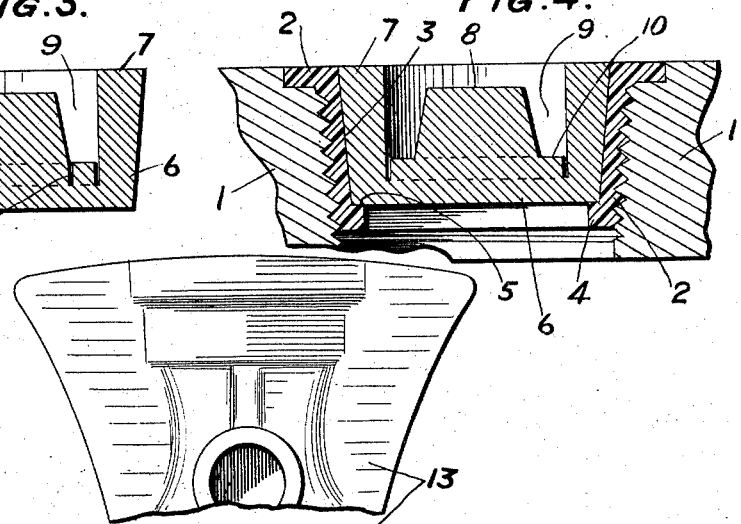
FIG.5.
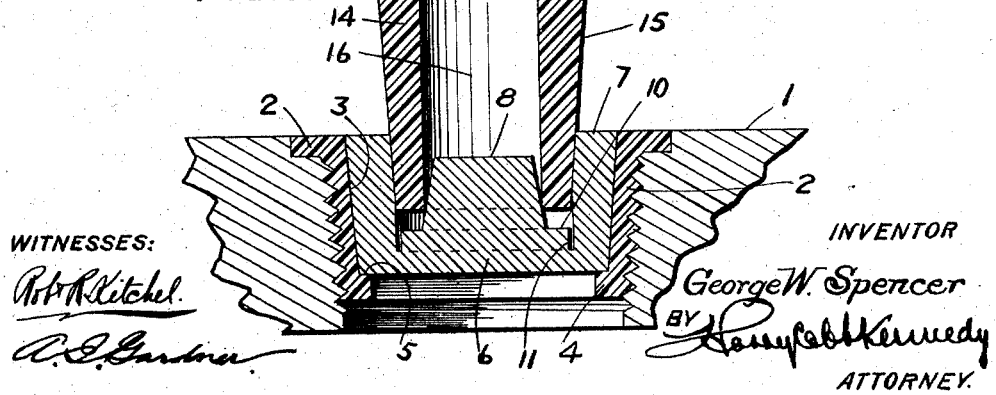
WITNESSES:
Rob R Kitchel
A. E. Gardner
INVENTOR
George W. Spencer
BY Harry Cobb Kennedy
ATTORNEY.
THE NORRIS PETERS CO., WASHINGTON, D.C.

G. W. SPENCER.
TAPPING APPARATUS.
APPLICATION FILED MAY 24, 1909.
965,762.
Patented July 26, 1910.
2 SHEETS—SHEET 2.
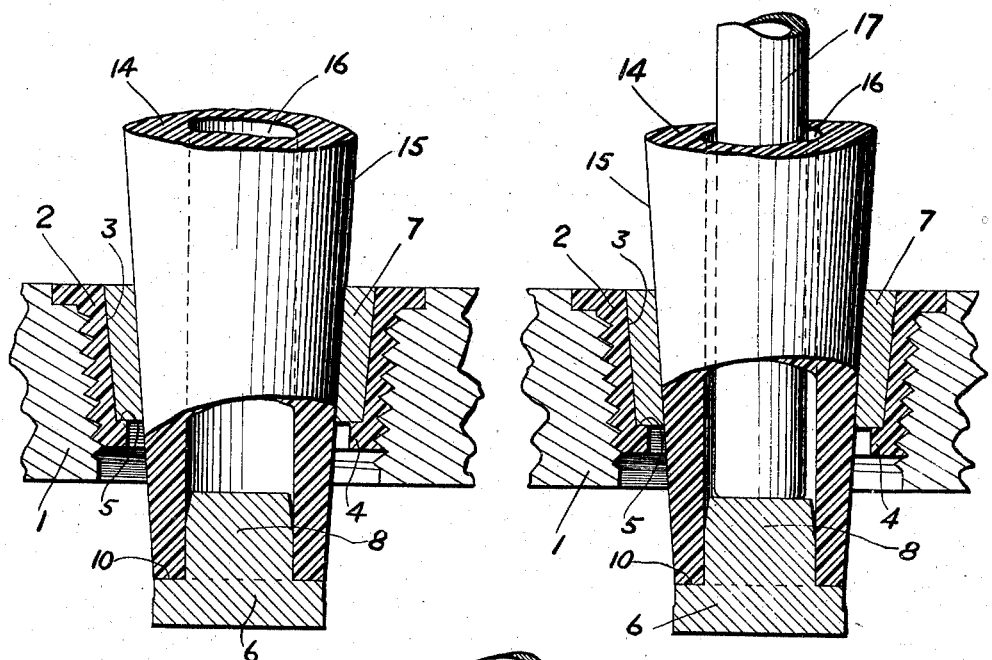
FIG. 6.
FIG. 7.
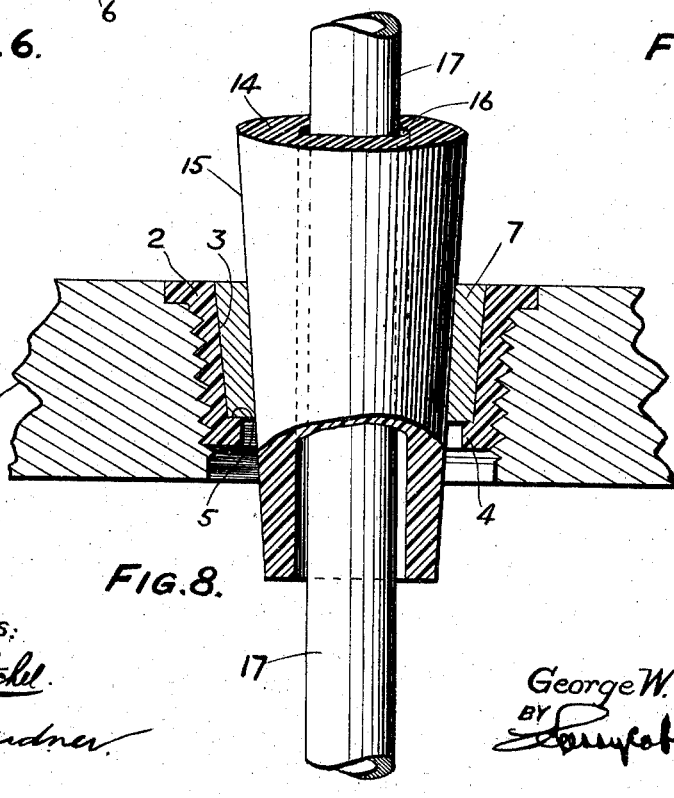
FIG. 8.
WITNESSES:
INVENTOR
George W. Spencer
BY
ATTORNEY.

ved* # UNITED STATES PATENT OFFICE.

GEORGE WILBUR SPENCER, OF ATLANTIC CITY, NEW JERSEY, ASSIGNOR TO SPENCER BUNG COMPANY, A CORPORATION OF NEW JERSEY.

TAPPING APPARATUS.

965,762.

Specification of Letters Patent. Patented July 26, 1910.

Application filed May 24, 1909. Serial No. 498,046.

*To all whom it may concern:*

Be it known that I, GEORGE WILBUR SPENCER, a citizen of the United States, and a resident of Atlantic City, county of Atlantic, State of New Jersey, have invented certain new and useful Improvements in Tapping Apparatus, of which the following is a full, clear, and complete disclosure.

My invention has reference to apparatus for tapping kegs, barrels and other receptacles containing sparkling or other liquids, and has particular reference to a bung proper, which is especially adapted for use in connection with the tapping apparatus that is now usually employed in this connection.

It will be understood, of course, that my improvement in a bung proper to be used in connection with the tapping apparatus is, as before stated, adapted for various uses, although for the purpose of illustrating its capabilities, and the new results which I claim, I have selected for the purpose of describing my improvements, their capabilities, and the new results which I attain, the tapping of, for instance, a barrel of beer.

With the above explanation, I will now proceed to describe my improved construction, and the way in which it is employed, in the tapping apparatus connected with a beer barrel, although as before stated the use of my invention is not confined thereto, but can be employed equally as well wherever the same or equivalent conditions exist.

My invention, therefore, consists in the means and instrumentalities and features of construction hereinafter fully described and claimed.

In the accompanying drawings, illustrating the application of my invention which I have selected to illustrate its use and the new results which I attain,—Figure 1 is a perspective view of a bung proper constructed in accordance with my invention. Fig. 2 is a central vertical section of the same; Fig. 3 is a central vertical section of a modified form of construction of the bung proper constructed in accordance with my invention; Fig. 4 is a central vertical section through a portion of the head of a barrel showing the bung bushing with the bung proper in place therein as initially inserted; Fig. 5 is a similar view showing the tapping device as it is first inserted into the bung proper; Fig. 6 is a similar view showing the position of the tapping device and stopper after the latter is severed; Fig. 7 is a similar view with a siphon tube in its initial position ready to drive the stopper from the tapping device; Fig. 8 is a similar view after the siphon tube has been driven into the barrel and has driven the stopper from the inner end of the tapping device.

Referring now to said drawings, 1 indicates the head of a barrel, or the like, and 2 a bung bushing of familiar construction seated in an opening in said head. As will be understood by those skilled in the art, the interior wall 3 of this bung bushing is slightly conical, and has an inwardly projecting flange 4 at its inner end forming an outwardly facing annular seat 5. The bung proper 6 is adapted to enter this bung bushing, and be firmly seated therein, in a manner hereinafter to be fully described.

In the tapping apparatus now usually employed, there is a tapping device through which gas or air is usually supplied to the interior of the cask, and through which a siphon tube enters the cask, and through which the liquid escapes. My invention is especially adapted for use in connection with this form of tapping apparatus, and comprises essentially a bung proper 6, composed of two members, which are initially and normally in one piece, consisting of an outer member 7, and an inner member 8, said members being severable, as hereinafter set forth, the said bung proper is conveniently made of wood, composition, or other material, preferably compressible. The outer face of the outer member, or wall 7, of the bung proper, is slightly tapered toward its lower end, or the end which is adjacent the interior of the cask, while the inner face of this outer member or wall 7, is preferably cylindrical. The inner member or stopper 8, is preferably concentric with the outer member 7, the upper portion thereof being separated therefrom by an annular channel, which, as will hereinafter be pointed out, receives the inner end of the tapping device. The said inner member or stopper 8, which is conical, tapering toward the outer end of the bung proper, is severably connected at its inner end with the inner end of the outer member 7, there being a bottom or seat 10 to the channel 9, extending between said inner and outer members 7 and 8. As before set forth, the bung proper 6 is in one piece initially, the inner member or stopper being severable from the outer member, preferably by weakening the same, conveniently along the inner face of said outer member, and in the instance illustrated, this weakening is attained by a kerf or cut 11, extending downwardly toward the lower end of the stopper, preferably in alinement with the inner face of said outer member, to prevent splitting or tearing out of the surrounding material, although as illustrated in Fig. 3, there may be another kerf or cut 12 in alinement with the outer face of the inner member or stopper 8.

The tapping device is indicated as a whole by 13, and is of the usual construction, having the lower tubular end 14 with a tapering outer wall 15, and a cylindrical interior 16. The siphon tube 17 is also of the usual construction, its outer diameter being less than the interior diameter of the tubular portion 14 of the tapping device.

The manner in which the improved tapping apparatus is employed is as follows: It will be understood, that in the manufacture of the bung proper, it is preferable to cut the outer face of the outer member 7, substantially cylindrical, and then to obtain its tapering or conical shape by the compression of the lower or inner end of said bung proper. When these bungs proper are to be used they are first soaked, preferably in water, before being driven into the bung bushing. As far as I am at present advised, the smaller end of the bung proper, or its inner end, extends to the greatest extent due to the soaking referred to, and when the bung is placed into the bung bushing, and driven so that it seats itself upon the seat 5, the material of the bung is compressed by the conical interior wall 3 of the bung bushing, so as to be firmly held therein and form a tight joint that will resist the pressure within the cask, it being noted that the outer end of the stopper is within the boundary of the outside of the cask, or in other words is shorter than the outer member 7. The casks can then be transported in this condition, and when it is desired to tap the barrel, or, it even may be, some time before it is desired to tap the cask, the tapping device 13, without the siphon tube, and without the use of a cork, or any means to inclose its inner end, is inserted in the outer end of the bung proper, the tapering severable stopper 8 entering the lower end of the tube 14 of the tapping device, while the outside wall of said tube 14 contacts with the inner face of the outer member 7. Then by applying pressure to the outer end of the tapping device, for instance, by a mallet, it being noted that by reason of the absence of the siphon tube, the blow may be delivered directly upon the outer end of the tapping device, the said tapping device is forcibly driven through the bung proper, severing the inner member or stopper 18 from the outer member, and passing into the interior of the barrel, or cask, for instance, as shown in Fig. 6. When this last operation takes place, it is found that the force necessary to sever the stopper 8 from the outer member, at the same time has the effect of driving the inner end of the tube 14 of the tapping device so tightly around the conical stopper, and sometimes, it may be, against the seat 10, that this stopper is so tightly wedged within the tube 14 of the tapping device, as to effectually and completely seal the same against the escape of the beer or liquid prematurely from the cask, thereby preventing the premature discharge of any of the liquid. By the same operation the outer face of the tube 14 is wedged tightly against the inner face of the outer member 7 to make a close joint to seal the cask at this point, or in other words, directly on top of said tapping device, not having the obstruction of the siphon rod, which, if in the said tapping device would necessitate the striking of an oblique blow, which might break the bung or eject the stopper before it was properly inserted in the tapping device. Now when it is desired to draw the beer, the siphon tube 17 is inserted through the tapping device 13 (it being understood, of course, that the usual air valve is tightened up around the siphon tube), and then by pressure or blow upon the siphon tube 17 the stopper 8 is driven from the inner end of the siphon tube and into the barrel thereby dislodging the conical stopper and discharging it into the barrel to permit the liquid to be forced or drawn through the siphon tube 17 from the barrel in the usual manner.

Having thus fully described my invention, what I claim as new and desire to secure by Letters Patent is:—

1. In tapping apparatus, a bung bushing having an outwardly facing seat, a bung proper seated within said bushing and provided with a severable stopper, the upper portion of which is separated from the outer portion of the bung proper by an annular channel, to receive a tapping device adapted to enter the said channel and to receive said stopper and by means of which the stopper is severed from the bung proper, and a tube adapted to enter said tapping device to eject said stopper from the end of the latter.

2. In a tapping apparatus, a bung bushing having a conical inner face and an outwardly facing seat at the inner end thereof, a bung proper seated within said bushing and provided with a separable stopper, the outer face of said bung proper being conical, the upper portion of said stopper being conical and separated from the outer portion of the bung proper by an annular channel, to receive a tapping device adapted to enter the said channel and to receive said stopper and by means of which the stopper is severed from the bung proper and a tube adapted to enter said tapping device to eject said stopper from the end of the latter.

3. In tapping apparatus, a bung bushing, a bung proper seated within said bushing, said bung proper consisting of an outer member, and an inner member suitably connected, the connection between said outer member or wall and inner member being weakened to permit the severing of said parts, an annular channel being provided between said outer and inner members, to receive a tapping device adapted to enter said channel and to receive said inner member and by means of which the inner member is severed from the bung proper, and a tube adapted to enter said tapping device to eject said inner member from the end of the latter.

4. In tapping apparatus, a bung bushing, a bung proper seated within said bushing, said bung proper consisting of an outer member and an inner member suitably connected, the connection between said outer member and inner member being provided with a cut extending toward the inner end or bottom of the bung proper to weaken the same to permit the severing of said parts, an annular channel being provided between said outer and inner members, to receive a tapping device to enter said channel and to receive said inner member by means of which the inner member is severed from the bung proper, and a tube adapted to enter said tapping device to eject said inner member from the end of the latter.

5. In a tapping apparatus, a bung bushing, a bung proper seated within said bushing, said bung proper consisting of an outer member and an inner member suitably connected, the connection between said outer member and inner member being provided with a cut substantially in alinement with the inner face of the outer member and extending toward the inner end or bottom of the bung proper to weaken the same to permit the severing of said parts, an annular channel being provided between said outer and inner members, to receive a tapping device adapted to enter said channel and to receive said inner member and by means of which the inner member is severed from the bung proper and a tube adapted to enter said tapping device to eject said inner member from the end of the latter.

6. In tapping apparatus, a bung proper suitably mounted in the cask to be tapped, said bung proper consisting of an outer member and an inner member suitably connected, the connection between said outer member and said inner member being weakened substantially in alinement with the inner face of the outer wall to permit the severing of said parts, an annular channel being provided between said outer and inner members, to receive a tapping device having a conical exterior adapted to enter said channel and to receive said inner member and by means of which the inner member is severed from the bung proper, and a tube adapted to enter said tapping device to eject said inner member from the end of the latter.

7. In tapping apparatus, a conical tapping device having a central bore, and a bung proper having in its top a conical recess forming an annular side and a bottom, the said tapping device fitting the said recess and adapted to engage the said bottom for severing the bottom from the said side on driving the tapping device home, and a conical stopper rising centrally from the said bottom and adapted to enter the said bore of said tapping device, the said stopper being nonseverable from the said bottom and being spaced from the said side and moving with the said bottom when the latter is forced out of the bung on driving the tapping device home, the said bung having an annular cut in the bottom in alinement with the inner face of the said side to render the bottom severable from the annular side of the bung, and the said bung having a second annular cut in the bottom in alinement with the outside of the said stopper.

8. A combined tapping bung and stopper, whereof the tapering cylindriform body thereof is provided with an internal circular deep tapering depression and having a base with notches in proximity to the inner wall of said bung as well as said stopper in combination with means to rupture the bottom of said bung and liberate the stopper therewith, substantially as and for the purposes described.

GEORGE WILBUR SPENCER.

Witnesses:
G. B. BLAINE,
I. M. BROOKE.